(12) United States Patent
Yamaguchi et al.

(10) Patent No.: US 9,050,688 B2
(45) Date of Patent: Jun. 9, 2015

(54) FRICTION STIR WELDING APPARATUS

(71) Applicants: F-TECH INC., Kuki, Saitama (JP); HONDA MOTOR CO., LTD., Tokyo (JP)

(72) Inventors: Hiroyasu Yamaguchi, Kazo (JP); Yukio Shoji, Kazo (JP); Mitsuru Sayama, Wako (JP); Tsutomu Kobayashi, Wako (JP)

(73) Assignees: F-TECH INC., Kuki (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/136,785

(22) Filed: Dec. 20, 2013

(65) Prior Publication Data

US 2014/0183245 A1    Jul. 3, 2014

(30) Foreign Application Priority Data

Dec. 28, 2012   (JP) .................................. 2012-288333

(51) Int. Cl.
*B23K 20/12* (2006.01)
*B23K 37/00* (2006.01)

(52) U.S. Cl.
CPC ............. *B23K 20/1245* (2013.01); *B23K 20/12* (2013.01); *B23K 20/1205* (2013.01); *B23K 20/125* (2013.01); *B23K 20/123* (2013.01); *B23K 20/129* (2013.01); *B23K 20/127* (2013.01); *B23K 37/003* (2013.01); *B23K 20/126* (2013.01)

(58) Field of Classification Search
CPC ............... B23K 20/12; B23K 20/1205; B23K 20/1215; B23K 20/123; B23K 20/1245; B23K 20/125; B23K 20/1255; B23K 20/126; B23K 20/127; B23K 20/1285; B23K 20/129
USPC .................................. 228/112.1, 113, 114, 2.1
See application file for complete search history.

(56) References Cited

U.S. PATENT DOCUMENTS 4,650,954 A * 3/1987 Frings et al. ............. 219/121.64
7,832,613 B2  11/2010 Hanlon et al.
(Continued)

FOREIGN PATENT DOCUMENTS

CA    2689774 A1    7/2010
EP    2208567 A2    7/2010
(Continued)

OTHER PUBLICATIONS

Notice of Reason of Rejection dated Feb. 10, 2015, issued in Japanese Application No. 2012-288333, w/English translation. (4 pages).

*Primary Examiner* — Erin Saad
(74) *Attorney, Agent, or Firm* — Westerman, Hattori, Daniels & Adrian, LLP (57) ABSTRACT

A friction stir welding apparatus having a new cooling system that can cool a portion required to be cooled accurately and uniformly with a simple configuration, while suppressing unnecessary thermal expansion of a mounting jig includes a holding mechanism 20 having a holding member 22a movable with respect to a processing target member W so as to freely hold the processing target member W, in which the holding member 22a and a portion of a mounting jig 12 that can freely face the holding member 22a become paired, and a coolant supply source S that can freely supply a coolant to the paired holding member 22a and the portion of the mounting jig 12.

4 Claims, 3 Drawing Sheets

(56) References Cited

U.S. PATENT DOCUMENTS

| | | |
|---|---|---|
| 2003/0209586 A1* | 11/2003 | Thompson .................... 228/103 |
| 2004/0079787 A1* | 4/2004 | Okamoto et al. .......... 228/112.1 |
| 2005/0045694 A1* | 3/2005 | Subramanian et al. .... 228/112.1 |
| 2007/0187466 A1* | 8/2007 | Sayama et al. ................ 228/101 |
| 2009/0108050 A1* | 4/2009 | Nagano ...................... 228/112.1 |
| 2010/0176182 A1 | 7/2010 | Hanlon et al. |

FOREIGN PATENT DOCUMENTS

| | | |
|---|---|---|
| EP | 2208567 A3 | 10/2010 |
| JP | 2001-087871 A | 4/2001 |
| JP | 2003-94176 A | 4/2003 |
| JP | 2003-290950 A | 10/2003 |
| JP | 4277247 B2 | 3/2009 |
| JP | 2010-162603 A | 7/2010 |
| JP | 4678749 B2 | 4/2011 |

* cited by examiner

FRICTION STIR WELDING APPARATUS

BACKGROUND OF THE INVENTION

The present invention relates to a friction stir welding apparatus, and more particularly relates to a friction stir welding apparatus having a cooling system that cools a processing target member and a mounting jig on which the processing target member is mounted.

In recent years, there has been proposed a friction stir welding apparatus that performs friction stirring on a predetermined portion to be welded in a processing target member formed by a plurality of metal plates such as aluminum plates by a probe rotating at a high speed, in addition to general arc welding, to weld the metal plates with each other. Even in a strength component of a movable body such as an automobile, a configuration having a welded by a friction stir welding apparatus has been realized.

In such a friction stir welding apparatus, while the probe is rotating at a high speed, a processing target member is moved relative to each other. Therefore, the processing target member is likely to become a high temperature due to frictional heat thereof. If the temperature of the processing target member becomes too high, welding quality of the welding portion to be friction stir welded may be affected, and thus it is desired to suppress that the temperature of the processing target member becomes excessively high.

Under such circumstances, Japanese Patent Application Laid-open Publication No. 2010-162603 relates to a friction stir welding system, and discloses a configuration including a backing plate 14 and a tungsten base material 12 arranged along the backing plate 14. The backing plate 14 has a gas flow passage 24 and a fluid flow passage 26 that cool or heat the tungsten base material 12 and a workpiece 20.

SUMMARY OF THE INVENTION

However, according to the studies made by the present inventors, in Japanese Patent Application Laid-open Publication No. 2010-162603, the backing plate 14 and the tungsten base material 12 are provided with a configuration on which the workpiece 20 is mounted. Accordingly, every time the shape of the workpiece 20 is changed, the arrangement of the gas flow passage 24 and the fluid flow passage 26, and the shapes of the backing plate 14 and the tungsten base material 12 need to be changed and optimized, and thus the configuration is cumbersome and there is a room for improvement.

Furthermore, according to the studies made by the present inventors, in Japanese Patent Application Laid-open Publication No. 2010-162603, because the workpiece 20 is cooled or heated only from below, in order to cool or heat the workpiece 20 from above, another backing plate 14 having the gas flow passage and the fluid flow passage needs to be provided above the workpiece 20. Therefore, the configuration is cumbersome and there is a room for improvement.

That is, under present circumstances, particularly, in the field of strength components of a vehicle such as an automobile in which various kinds of processing target members are present, at the time of friction stir welding of various kinds of processing target members, realization of a friction stir welding apparatus having a new cooling system that can cool a portion required to be cooled accurately and uniformly with a simple configuration, while suppressing unnecessary thermal expansion of a mounting jig, has been desired.

The present invention has been achieved in view of the above studies, and an object of the present invention is to provide a friction stir welding apparatus having a new cooling system that can cool a portion required to be cooled accurately and uniformly with a simple configuration, while suppressing unnecessary thermal expansion of a mounting jig at a time of friction stir welding of various kinds of processing target members.

To achieve the above object, a first aspect of the present invention is to provide a friction stir welding apparatus comprising: a welding tool that is freely movable in a vertical direction with respect to a processing target side surface of a processing target member and having a probe that is freely rotatable with respect to the processing target member; a mounting member having a mounting jig on which the processing target member is mounted; a movement mechanism having an arm to which an attachment jig attached with the welding tool is fixed so as to be able to freely move the welding tool with respect to the processing target member by moving the arm; a holding mechanism having a holding member movable with respect to the processing target member so as to freely hold the processing target member, in which the holding member and a portion of the mounting jig that can freely face the holding member become paired; and a coolant supply source that can freely supply a coolant to the paired holding member and the portion of the mounting jig.

According to a friction stir welding apparatus of a second aspect of the present invention, in addition to the first aspect, the paired holding member and the portion of the mounting jig are connected by a pipe having flexibility, and the coolant is supplied from the coolant supply source to one of the holding member and the portion of the mounting jig and is returned to the coolant supply source after flowing from the one of the holding member and the portion of the mounting jig to the other one via the pipe.

According to a friction stir welding apparatus of a third aspect of the present invention, in addition to the first or second aspect, the mounting jig has a lower mounting portion and an upper mounting portion provided on the lower mounting portion and coming in contact with the processing target member, and a coefficient of thermal conductivity of the lower mounting portion is set larger than that of the upper mounting portion, and strength of the upper mounting portion is set higher than that of the lower mounting portion.

According a friction stir welding apparatus of to a fourth aspect of the present invention, in addition to any of the first to third aspects, the paired holding member and the portion of the mounting jig form plural pairs according to a shape of the mounting jig as viewed from above, and the plural pairs of holding member and the portion of the mounting jig respectively form a cooling system independent from each other that independently circulates the coolant.

According to the configuration of the first aspect of the present invention, the holding mechanism having the holding member movable with respect to the processing target member so as to freely hold the processing target member, in which the holding member and the portion of the mounting jig that can freely face the holding member become paired, and the coolant supply source that can freely supply the coolant to the paired holding member and the portion of the mounting jig are provided. Consequently, when various types of processing target members are to be friction stir welded, a portion required to be cooled can be cooled accurately and uniformly with a simple configuration, while suppressing unnecessary thermal expansion of the mounting jig.

According to the configuration of the second aspect of the present invention, the paired holding member and the portion of the mounting jig are connected by the pipe having flexibility, and the coolant is supplied from the coolant supply source to one of the holding member and the portion of the mounting jig, and is returned to the coolant supply source after flowing from the one of the holding member and the portion of the mounting jig to the other one via the pipe. Consequently, unnecessary thermal expansion of the mounting jig can be suppressed by using the coolant sequentially flowing in a series of flow passages, and the portion required to be cooled can be cooled accurately and uniformly, while simplifying the routing arrangement configuration of the flow passages.

According to the configuration of the third aspect of the present invention, the mounting jig has the lower mounting portion and the upper mounting portion provided on the lower mounting portion and coming in contact with the processing target member, and the coefficient of thermal conductivity of the lower mounting portion is set larger than that of the upper mounting portion, and the strength of the upper mounting portion is set larger than that of the lower mounting portion. Consequently, at the time of friction stir welding using a welding tool, heat generated in the processing target member is transmitted to the lower mounting portion via the upper mounting portion, and particularly unnecessary thermal expansion of the upper mounting portion can be suppressed, and the portion required to be cooled can be cooled accurately and uniformly, while reliably supporting the processing target member by the upper mounting portion.

According to the configuration of the fourth aspect of the present invention, the paired holding member and the portion of the mounting jig form a plurality of pairs according to the shape of the mounting jig as viewed from above, and the plural pairs of holding member and the portion of the mounting jig respectively form a cooling system independent from each other that independently circulates the coolant. Consequently, unnecessary thermal expansion of the mounting jig can be suppressed and the portion required to be cooled can be cooled accurately and uniformly, in a mode having high cooling flexibility according to the configuration of the welding portion of the processing target member mounted on the mounting jig.

DETAILED DESCRIPTION OF THE PREFERRED EMBODIMENT

A friction stir welding apparatus according to an embodiment of the present invention is explained in detail below with reference to the accompanying drawings. In the drawings, an x-axis, a y-axis, and a z-axis constitute a three-axis orthogonal coordinate system. A plane defined by the x-axis and the y-axis is parallel to a horizontal plane, and a normal direction of the z-axis is an upward direction.

First, a configuration of the friction stir welding apparatus according to the present embodiment is explained in detail with reference to FIG. 1 to FIGS. 3A and 3B.

Figure 1:
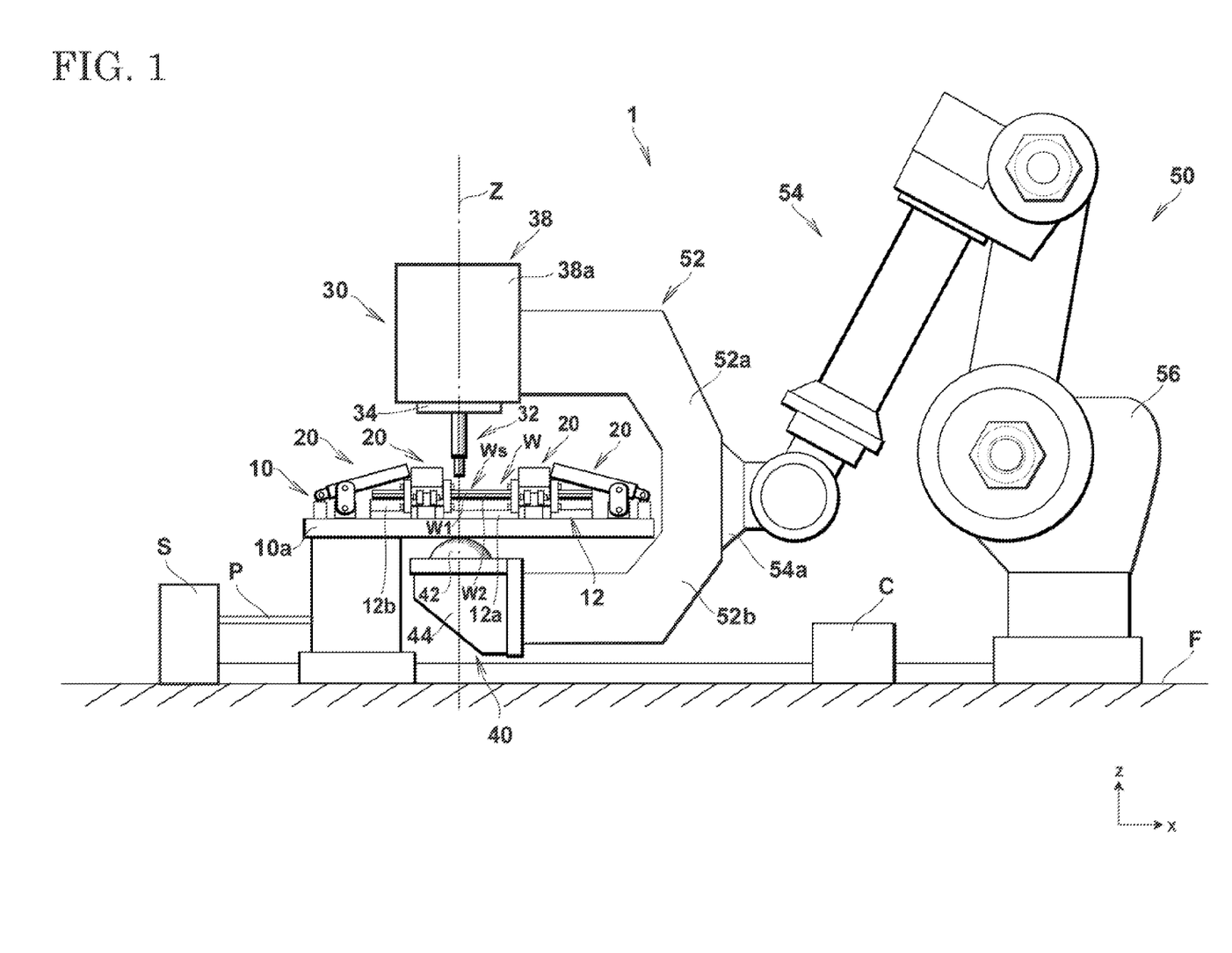
FIG. 1 is a side view showing an overall configuration of a friction stir welding apparatus according to an embodiment of the present invention.
Figure 2:
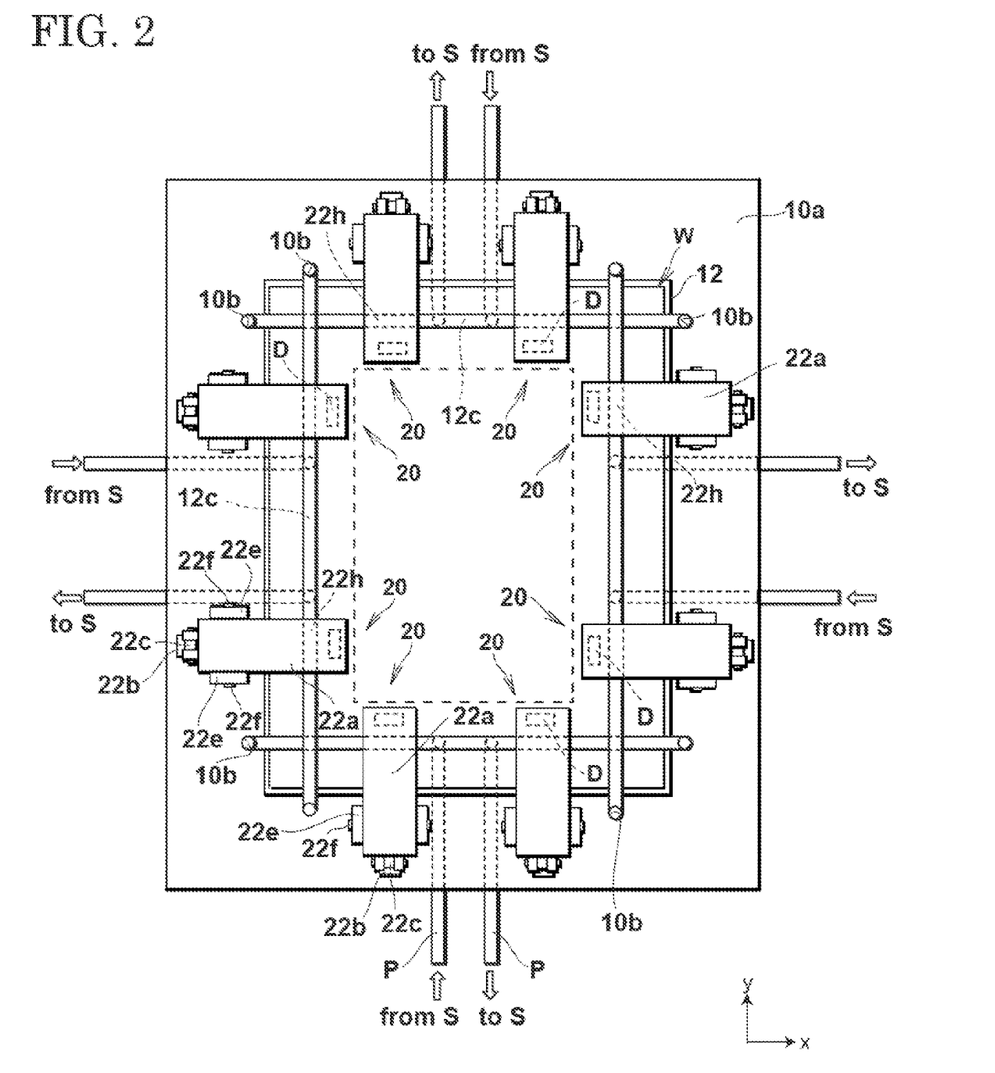
FIG. 2 is a top view showing a state where a holding mechanism holds a processing target member mounted on a mounting jig of a mounting table of the friction stir welding apparatus according to the embodiment.
Figure 3A:
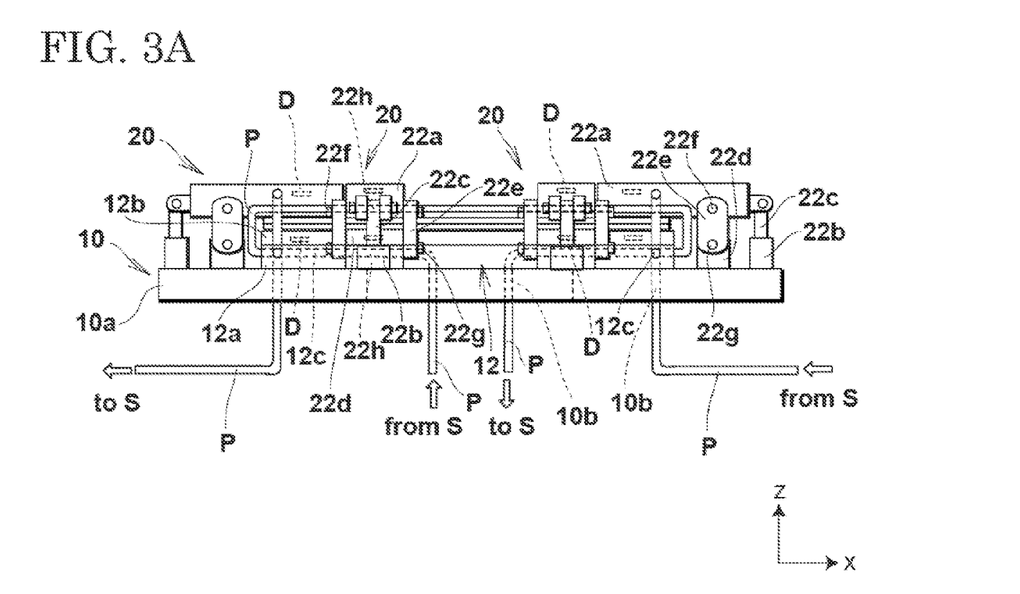
FIG. 3A is a side view showing a state where the holding mechanism holds a processing target member mounted on the mounting jig of the mounting table of the friction stir welding apparatus according to the embodiment, and is a side view of FIG. 2 as viewed in a positive direction of a y-axis.
Figure 3B:
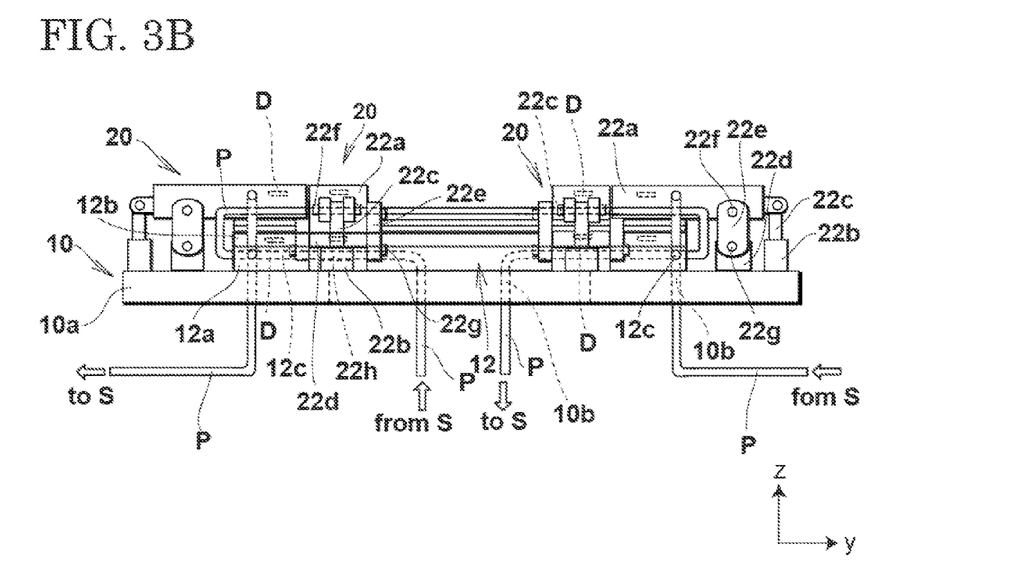
FIG. 3B is a side view showing a state where the holding mechanism holds a processing target member mounted on the mounting jig of the mounting table of the friction stir welding apparatus according to the embodiment, and is a side view of FIG. 2 as viewed in a negative direction of an x-axis.

FIG. 1 is a side view showing an overall configuration of the friction stir welding apparatus according to an embodiment of the present invention. FIG. 2 is a top view showing a state where a holding mechanism holds a processing target member mounted on a mounting jig of a mounting table of the friction stir welding apparatus according to the present embodiment. FIG. 3A is a side view showing a state where the holding mechanism holds a processing target member mounted on the mounting jig of the mounting table of the friction stir welding apparatus according to the present embodiment, and is a side view of FIG. 2 as viewed in a positive direction of a y-axis. FIG. 3B is a side view showing a state where the holding mechanism holds a processing target member mounted on the mounting jig of the mounting table of the friction stir welding apparatus according to the present embodiment, and is a side view of FIG. 2 as viewed in a negative direction of an x-axis. In FIG. 1, pipes are not shown for convenience sake, and in FIGS. 2, 3A, and 3B, only a mounting portion and the mounting jig of the mounting table are shown for convenience sake, and a welding tool and the like are not shown.

As shown in FIGS. 1 to 3A and 3B, a friction stir welding apparatus 1 includes a mounting table 10 fixedly installed on the floor F to mount a processing target member W thereon, a holding mechanism 20 fixedly installed on the mounting table 10 to fix the processing target member W detachably, a welding tool 30 that can be freely arranged opposite to the mounting table 10 above the mounting table 10, a supplementary support mechanism 40 that can be freely arranged so as to abut on a lower surface of the mounting table 10 below the mounting table 10, and a robot 50 fixedly installed on the floor F so as to hold the welding tool 30 and the supplementary support mechanism 40 by an attachment jig 52. A coolant is supplied to the mounting table 10 and the holding mechanism 20 from a coolant supply source S via a pipe P. In principle, the coolant can be liquid or gas.

Specifically, the mounting table 10 is a mounting member including a mounting jig 12 fixedly installed on a mounting portion 10a thereof to mount the processing target member W thereon. The mounting portion 10a is typically made of metal such as an iron material having sufficient strength and stiffness. The mounting jig 12 is typically made of metal having sufficient strength, stiffness, and thermal conductivity. The processing target member W is typically a plate member made of metal such as an aluminum material, in which a first member W1 and a second member W2 are juxtaposed in a vertical direction and respectively have an overlapped portion on each other. Predetermined region of the overlapped portions of the first member W1 and the second member W2 are welded along a predetermined weld line by the welding tool 30 that is moved along a predetermined welding direction. The position of the processing target member W on the mounting jig 12 is maintained accurately by holding a part of the processing target member W by the holding mechanism 20. The predetermined weld line formed by the welding tool 30 typically includes a line extending along an edge of the processing target member W.

Particularly as shown in FIGS. 1 to 3A and 3B, the mounting jig 12 has a two-layer structure including a lower mounting portion 12a typically made of brass and fixedly installed on an upper surface of the mounting portion 10a of the mounting table 10, and an upper mounting portion 12b made of an iron material having strength higher than that of the lower mounting portion 12a and fixedly installed on the lower mounting portion 12a. A coefficient of thermal conductivity of the lower mounting portion 12a is larger than that of the upper mounting portion 12b, and the strength of the upper mounting portion 12b is higher than that of the lower mounting portion 12a. Furthermore, the mounting jig 12 typically has a rectangular frame shape as viewed from above. In such a case, the processing target member W is supported mainly on the rectangular frame, and a predetermined weld line of the processing target member W to be formed by the welding tool 30 is sequentially formed on the rectangular frame.

Particularly as shown in FIGS. 2, 3A, and 3B, the holding mechanism 20 is provided corresponding to each side of the mounting jig 12, which has typically the rectangular frame shape as viewed from above, and a configuration in which two holding mechanisms 20 are provided respectively on each side is explained here as an example. The holding mechanism 20 includes a holding member 22a that can freely press an upper surface of the first member W1 of the processing target member W mounted on the mounting jig 12, and a motor 22b fixed on a side of the mounting portion 10a of the mounting table 10 to apply a drive force that can drive the holding member 22a to be freely movable between an upper position and a lower position. As a drive source that drives the holding member 22a, an air cylinder can be mentioned other than the motor.

The holding member 22a is a thick plate member typically made of metal such as an iron material having sufficient strength, stiffness, and thermal conductivity. The holding member 22a is pivotally supported by and attached to a shaft 22c that connects the holding member 22a and the motor 22b, and is attached to a support member 22e typically made of metal such as an iron material having sufficient strength and stiffness. The motor 22b is fixedly installed on the upper surface of the mounting portion 10a of the mounting table 10. The support member 22e includes a turning shaft 22f that pivotally supports the holding member 22a, and a turning shaft 22g pivotally supported by the base block 22d, thereby supporting the holding member 22a to be freely movable between the upper position and the lower position. That is, by driving the motor 22b, the holding member 22a is moved so as to be able to freely advance and retract with respect to the processing target member W via the support member 22e supported by the base block 22d, and a portion of the holding member 22a that advances with respect to the processing target member W to hold the processing target member W is set to be adjacent to the weld line extending along the circumferential end portion of the processing target member W.

A flow passage 22h passing through the holding member 22a is provided in the holding member 22a, and the coolant supplied from the coolant supply source S via the pipe P can freely flow into the flow passage 22h. A temperature sensor D such as a thermocouple is arranged in the holding member 22a.

In the holding mechanism 20, when the processing target member W is mounted on the mounting jig 12, by driving the motor 22b to move the shaft 22c in a vertical direction, the holding member 22a turns around the turning shafts 22f and 22g defined in the support member 22e. Corresponding thereto, the holding member 22a can move between the upper position shown in FIG. 1 and the lower position shown in FIGS. 2, 3A, and 3B to freely advance and retract with respect to the processing target member W. When the holding member 22a is positioned at the lower position shown in FIGS. 2, 3A, and 3B to press and hold the upper surface of the first member W1 of the processing target member W with a predetermined load, if the temperature of the temperature sensor D arranged in the holding member 22a has exceeded a predetermined temperature, the coolant is supplied from the coolant supply source S and flows into the flow passage 22h via the pipe P, and after flowing in the flow passage 22h, the coolant is discharged to the pipe P on a subsequent stage. When the holding member 22a is positioned at the lower position shown in FIGS. 2, 3A, and 3B to press and hold the upper surface of the first member W1 of the processing target member W with the predetermined load, the holding member 22a is positioned, covering an overlapped portion of the processing target member W and the mounting jig 12 as viewed from above.

Meanwhile, a plurality of flow passages 12c passing through the lower mounting portion 12a of the mounting jig 12 are provided in the lower mounting portion 12a, and the coolant supplied from the coolant supply source S via the pipe P can freely flow into the respective flow passages 12c. The temperature sensor D such as a thermocouple is arranged in the upper mounting portion 12b of the mounting jig 12. When the temperature of the temperature sensor D arranged in the upper mounting portion 12b has exceeded a predetermined temperature, the coolant is supplied from the coolant supply source S and flows into the flow passages 12c via the pipe P, and after flowing in the flow passages 12c, the coolant is discharged to the pipe P on the subsequent stage.

The flow passages 12c in the lower mounting portion 12a of the mounting jig 12 are provided in a plurality of routes. The flow passages 12c in the respective routes are arranged so as to face the corresponding holding member 22a in the vertical direction when the holding member 22a is at the lower position shown in FIGS. 2, 3A, and 3B to hold and press the upper surface of the first member W1 of the processing target member W with the predetermined load. That is, when the holding member 22a is at the lower position shown in FIGS. 2, 3A, and 3B to hold and press the upper surface of the first member W of the processing target member W with the predetermined load, the portion of the lower mounting portion 12a provided with the plurality of flow passages 12c overlaps on the corresponding holding member 22a respectively via the processing target member W, as viewed from above, and it can be said that the portion of the lower mounting portion 12a provided with the flow passages 12c and the holding member 22a facing each other correspondingly become paired in this manner. As a result, the number of pairs formed of the portion of the lower mounting portion 12a provided with the flow passages 12c and the holding member 22a is equal to the number of holding members 22a. From a viewpoint of cooling the processing target member W efficiently, it is desired that the flow passage 12c in the lower mounting portion 12a and the flow passage 22h in the holding member 22a corresponding to each other overlap on each other as viewed from above in this manner.

Specifically, a cooling system of the friction stir welding apparatus 1 includes the coolant supply source S, the holding mechanism 20 including the holding member 22a provided with the flow passage 22h, the mounting jig 12 including the lower mounting portion 12a provided with the plurality of flow passages 12c, and the pipe P that connects these parts correspondingly, and typically forms an independent mode on each side of the rectangular mounting jig 12. That is, with regard to the cooling system on each side of the mounting jig 12, the coolant is independently supplied from the coolant supply source S separately from the cooling systems on other sides, and the supplied coolant flows in the flow passage 12c in the left lower mounting portion 12a, the flow passage 22h in the left holding member 22a, the flow passage 22h in the right holding member 22a, and the flow passage 12c in the right lower mounting portion 12a shown in FIGS. 3A and 3B, and returns to the same coolant supply source S again. The coolant flows in such a cyclic path, and the configuration of the cooling system is the same on each side of the mounting jig 12. The pipe P connected to the flow passage 22h in the holding member 22a is made of a material having flexibility such as synthetic resin, and can freely deform following the movement of the holding member 22a when the holding member 22a holds and releases the processing target member w. That is, in FIGS. 3A and 3B, the pipe P between the flow passage 12c in the left lower mounting portion 12a and the flow passage 22h in the left holding member 22a, the pipe P between the flow passage 22h in the left holding member 22a and the flow passage 22h in the right holding member 22a, and the pipe P between the flow passage 22h in the right holding member 22a and the flow passages 12c in the right lower mounting portion 12a have such flexibility.

In FIG. 1, the coolant supply source S is integrated to one coolant supply source S for simplifying the configuration. However, an individual coolant supply source S can be provided with respect to the cooling system on each side of the mounting jig 12. The sequence of causing the coolant to flow in the cooling system on each side of the mounting jig 12 is not limited, so long as the coolant is circulated between the flow passage 12c in the lower mounting portion 12a and the flow passage 22h in the holding member 22a. As the configuration in which the pipe P passes through the mounting portion 10a, a flow passage 10b, a notch, or the like can be provided in the mounting portion 10a so that the pipe P can pass therethrough, or the pipe P can take a detour without providing them. When the mounting jig 12 has a shape such as another multangular shape or a circular shape according to the shape of the processing target member W, the cooling system of the mounting jig 12 can be divided and separated with respect to each side thereof or each circular arc having a predetermined length. Furthermore, the mounting portion 10a and the lower mounting portion 12a of the mounting jig 12 can be integrated with each other. In this case, the mounting portion 10a can be provided with a flow passage by using a material presenting sufficient thermal conductivity.

The welding tool 30 includes a probe 32 that is typically a columnar member made of metal such as an iron material extending in a vertical direction and is freely rotatable around a central axis Z, which is parallel to the z-axis, and is freely movable in the vertical direction, a holder 34 that holds the probe 32, and a drive mechanism 38 that causes the probe 32 held by the holder 34 to move in the vertical direction and rotate around the central axis Z. The drive mechanism 38 includes a motor and a shaft (both not shown) incorporated in a casing 38a. The direction of the central axis Z of the probe 32 is a pressing direction for pressing the processing target member W by rotating the probe 32 at the time of friction stir welding.

The casing 38a can function also as a frame member fixed to the attachment jig 52 while supporting various constituent elements, and has a hollow cuboidal shape as an example of the structure thereof. In such a welding tool 30, when the drive mechanism 38 moves the holder 34 holding the probe 32 downward, a lower part of the probe 32 is press-fitted into the processing target member W, and can freely reach a position at which the probe 32 penetrates the second member W2, passing through the first member W1 in the processing target member W. The upper surface of the first member W1 of the processing target member W is referred to as "processing target side surface Ws" for convenience sake.

The supplementary support mechanism 40 includes a supplementary support member 42, which is typically a ball member made of metal such as an iron material, and abuts on a lower surface of the mounting portion 10a on an opposite side to the mounting jig 12, and a holder 44 that holds the supplementary support member 42 rotatably, while maintaining the central position thereof immovable. In the supplementary support mechanism 40, the supplementary support member 42 can freely support the mounting table 10 supplementarily, while abutting on the lower surface of the mounting portion 10a of the mounting table 10 at one point in the upper part of the supplementary support member 42, in a state with the supplementary support member 42 facing the lower end of the probe 32, putting the processing target member W therebetween.

The robot 50 is a movement mechanism that can freely move the welding tool 30 and the processing target member W fixed on the mounting jig 12 of the mounting table 10 relative to each other, and typically, is an industrial robot. Specifically, the robot 50 includes an attachment jig 52 made of metal in a two-pronged shape as viewed from the side, which is typically a chopped steel product and has an upper attachment portion 52a and a lower attachment portion 52b, respectively, attached with the welding tool 30 and the supplementary support mechanism 40 correspondingly, an arm 54 attached with the attachment jig 52, which is typically a manipulator having multiple joints, and a robot body 56 having a drive mechanism that moves the arm 54, a computing processing unit, and a memory incorporated therein (all not shown).

While the casing 38a of the drive mechanism 38 of the welding tool 30 is attached and fixed to the upper attachment portion 52a of the attachment jig 52, the holder 44 of the supplementary support mechanism 40 is attached and fixed to the lower attachment portion 52b of the attachment jig 52. A connected portion between the upper attachment portion 52a and the lower attachment portion 52b of the attachment jig 52 is fixed and attached to a support portion 54a at one end of the arm 54 by fastening or the like, and the robot body 56 is connected to the other end of the arm 54. By operating the drive mechanism of the robot body 56, the arm 54 moves, and corresponding thereto, the welding tool 30 and the supplementary support mechanism 40 can be freely moved with multiple degrees of freedom to the left, right, up, and down, while maintaining the relative positional relation between the welding tool 30 and the supplementary support mechanism 40.

The respective constituent elements associated with the friction stir welding apparatus 1 are appropriately controlled by receiving a control signal transmitted from a controller C, and operate so as to perform friction stir welding process with respect to the processing target member W. Specifically, after the controller C moves the arm 54 via the robot body 56 of the robot 50 to position the welding tool 30 above the processing target member W mounted on the mounting jig 12, the controller C moves the welding tool 30 downward to the processing target member W to press-fit the probe 32 into the processing target member W and rotate the probe 32, and stirs the processing target member W by the probe 32 while generating frictional heat in the processing target member W. The controller C then executes control to perform friction stir welding with respect to the processing target member W along a predetermined weld line by moving the probe 32 and the processing target member W relative to each other by the arm 54. Simultaneously, the controller C executes control to cause the coolant to flow into each cooling system corresponding to each side of the mounting jig 12 at the time of executing friction stir welding. The controller C has a computing processing unit and a memory (both not shown) incorporated therein, and a control program for executing friction stir welding, and data of a predetermined welding direction are stored in the memory.

Next, various operations to be performed by the friction stir welding apparatus 1 at the time of executing friction stir welding with respect to the processing target member W by using the friction stir welding apparatus 1 having the configuration described above are explained below in detail.

First, before starting a series of processes of friction stir welding, as preparation therefor, under control of the controller C, the operation of the coolant supply source S is started to supply the coolant to the cooling system on each side of the mounting jig 12 to fill the flow passage 22h in the holding member 22a, the flow passage 12c in the lower mounting portion 12a, and the pipe P that connects these flow passages with the coolant, and thereafter, the operation of the coolant supply source S is stopped to stop supply of the coolant.

Next, after the processing target member W is mounted on the mounting jig 12 of the mounting table 10, as shown in FIGS. 2, 3A, and 3B, the motor 22b of the holding mechanism 20 is driven under control of the controller C to move the holding member 22a downward, and after the lower surface of the holding member 22a is caused to abut on the upper surface of the first member W1, the holding member 22a is caused to press and hold the first member W1 with a predetermined load, so that the position of the processing target member W is maintained accurately.

Next, as shown in FIG. 1, under control of the controller C, the drive mechanism of the robot body 56 appropriately moves the arm 54 vertically and horizontally, to arrange the probe 32 of the welding tool 30 attached to the upper attachment portion 52a of the attachment jig 52 so as to face the processing target member W above thereof at a predetermined position above the processing target member W. At this time, the supplementary support member 42 of the supplementary support mechanism 40 attached to the lower attachment portion 52b of the attachment jig 52 is caused to abut on the lower surface of the mounting portion 10a of the mounting table 10 at one point in the upper part of the supplementary support member 42, so that the supplementary support member 42 of the supplementary support mechanism 40 faces the lower end of the probe 32, putting the processing target member W therebetween.

Next, when respective positions of the probe 32 and the supplementary support member 42 are realized in this manner, under control of the controller C, the drive mechanism 38 of the welding tool 30 moves the holder 34 holding the probe 32 downward to move the probe 32 downward, so that the lower end of the probe 32 reaches a predetermined position at which the lower part of the probe 32 passes through the first member W1 of the processing target member W and penetrates the second member W2. A penetration depth of the probe 32 passing through the first member W1 and penetrating the second member W2 is maintained substantially constant at the time of executing friction stir welding. At this time, the drive mechanism 38 of the welding tool 30 can rotate the probe 32 via the holder 34 according to need.

Next, when the lower part of the probe 32 has reached the predetermined position in this manner, in a state where the drive mechanism 38 of the welding tool 30 is continuously rotating the probe 32 under control of the controller C, the drive mechanism of the robot body 56 moves the arm 54 so that the probe 32 and the supplementary support member 42 are moved in a moving direction, which is the predetermined welding direction, in a state with their positional correspondence relation with respect to the processing target members W being maintained. As a result, the first member W1 and the second member W2 are friction stir welded corresponding to a moved track of the lower part of the probe 32. Simultaneously, the supplementary support member 42 is being moved in the predetermined welding direction while rotating in the holder 44, in the state where the supplementary support member 42 abuts on the lower surface of the mounting portion 10a of the mounting table 10 at one point in the upper part of the supplementary support member 42, so as to face the lower part of the probe 32, putting the processing target member W therebetween.

At this time, the controller C monitors a detected temperature value of the temperature sensor D arranged in the flow passage 22h in the holding member 22a, and a detected temperature value of the temperature sensor D arranged in the upper mounting portion 12b, in each cooling system on each side of the mounting jig 12. When judging that any of the detected temperature values has exceeded a predetermined temperature value and becomes high, under control of the controller C, the operation of the coolant supply source S is started to supply the coolant to the cooling system on each side of the mounting jig 12 to cause the coolant to flow in the flow passage 22h in the holding member 22a, the flow passage 12c in the lower mounting portion 12a, and the pipe P that connects these flow passages. Thereafter, when judging that all the detected temperature values become equal to or lower than the predetermined temperature value, the operation of the coolant supply source S is stopped under control of the controller C. The control of the cooling system is executed while friction stir welding is being executed.

In this case, while the coolant is being supplied to the cooling system on each side of the mounting jig 12 so that the coolant flows into the flow passage 22h in the holding member 22a, the flow passage 12c in the lower mounting portion 12a, and the pipe P that connects these flow passages, the temperature of the mounting jig 12 becomes lower than that of the processing target member W mounted on the mounting jig 12, thereby suppressing unnecessary thermal expansion thereof. Furthermore, the heat of the processing target member W is transmitted to the coolant flowing in the flow passage 12c in the lower mounting portion 12a via the upper mounting portion 12b and the lower mounting portion 12a according to the temperature gradient, thereby cooling the processing target member W. Simultaneously therewith, the temperature of the holding member 22a becomes lower than that of the processing target member W mounted on the mounting jig 12. Therefore, the heat of the processing target member W is transmitted to the coolant flowing in the flow passage 22h in the holding member 22a via the holding member 22a, thereby cooling the processing target member W.

Next, when the probe 32 has been moved in this manner to a predetermined position, which is an end point of a portion required to be friction stir welded, with the movement of the arm 54, the drive mechanism 38 of the welding tool 30 moves the probe 32 upward, while maintaining the rotation of the probe 32, to pull out the probe 32 from the processing target member W under control of the controller C, and after having uplifted the probe 32 to the position above the processing target member W, stops the movement of the probe 32. The drive mechanism of the robot body 56 then moves the arm 54 so that the probe 32 and the supplementary support member 42 exit from the areas above and below the processing target member W, and stops the movement of the arm 54.

Next, when the probe 32 and the supplementary support member 42 have exited in this manner, under control of the controller C, the motor 22b is driven to move the holding member 22a upward so that the holding member 22a exits from the area above the first member W1 of the processing target member W, and then stops the movement of the holding member 22a.

Finally, by detaching the processing target member W from the mounting table 10, a processed product in which a predetermined portion is friction stir welded can be obtained.

In the configuration of the present embodiment described above, a configuration example of applying the supplementary support mechanism 40 has been explained. However, the supplementary support mechanism 40 can be omitted when required processing accuracy is relatively low.

In the configuration of the present embodiment described above, it has been explained that the supplementary support member 42 of the supplementary support mechanism 40 is a ball member. However, other movable members such as a rotatable member can be applied, or a fixed member can be used when friction or the like hardly occurs.

According to the configuration of the present embodiment described above, the holding mechanism 20 having the holding member 22a movable with respect to the processing target member W so as to freely hold the processing target member W, in which the holding member 22a and the portion of the mounting jig 12 that can freely face the holding member 22a become paired, and the coolant supply source S that can freely supply the coolant to the paired holding member 22a and the portion of the mounting jig 12 are provided. Consequently, when various types of processing target members W are to be friction stir welded, a portion required to be cooled can be cooled accurately and uniformly with a simple configuration, while suppressing unnecessary thermal expansion of the mounting jig 12.

According to the configuration of the present embodiment, the paired holding member 22a and the portion of the mounting jig 12 are connected by the pipe P having flexibility, and the coolant is supplied from the coolant supply source S to one of the holding member 22a and the portion of the mounting jig 12 and is returned to the coolant supply source S after flowing from the one of the holding member 22a and the portion of the mounting jig 12 to the other one via the pipe P. Consequently, unnecessary thermal expansion of the mounting jig 12 can be suppressed by using the coolant sequentially flowing in a series of flow passages 12c, 22h, and P, and the portion required to be cooled can be cooled accurately and uniformly, while simplifying the routing arrangement configuration of the flow passages 12c, 22h, and P.

According to the configuration of the present embodiment, the mounting jig 12 has the lower mounting portion 12a and the upper mounting portion 12b provided on the lower mounting portion 12a and coming in contact with the processing target member W, and the coefficient of thermal conductivity of the lower mounting portion 12a is set larger than that of the upper mounting portion 12b, and the strength of the upper mounting portion 12b is set higher than that of the lower mounting portion 12a. Consequently, at the time of friction stir welding using the welding tool 30, heat generated in the processing target member W is transmitted to the lower mounting portion 12a via the upper mounting portion 12b, and particularly unnecessary thermal expansion of the upper mounting portion 12b can be suppressed, and the portion required to be cooled can be cooled accurately and uniformly, while reliably supporting the processing target member W by the upper mounting portion 12b.

According to the configuration of the present embodiment, the paired holding member 22a and the portion of the mounting jig 12 form a plurality of pairs according to the shape of the mounting jig 12 as viewed from above, and the plural pairs holding member 22a and the portion of the mounting jig 12 respectively form a cooling system independent from each other that independently circulates the coolant. Consequently, unnecessary thermal expansion of the mounting jig 12 can be suppressed and the portion required to be cooled can be cooled accurately and uniformly, in the mode having high cooling flexibility according to the configuration of the welding portion of the processing target member W mounted on the mounting jig 12.

In the present invention, the shape, the arrangement, the number, and the like of the members are not limited to those in the embodiments explained above, and it is needless to mention that the constituent elements can be modified as appropriate without departing from the scope of the invention, such as appropriately replacing these elements by other ones having identical operational effects.

As described above, the present invention can provide a friction stir welding apparatus having a new cooling system that can cool the portion required to be cooled accurately and uniformly with a simple configuration, while suppressing unnecessary thermal expansion of the mounting jig, at the time of friction stir welding of various kinds of processing target members. Therefore, because of its general purposes and universal characteristics, applications of the present invention can be expected in a wide range in the field of friction stir welding of a strength member of a movable body such as an automobile.

What is claimed is:

1. A friction stir welding apparatus comprising:
a welding tool that is movable in a vertical direction with respect to a processing target side surface of a processing target member and having a probe that is rotatable with respect to the processing target member;
a mounting member having a mounting jig on which the processing target member is mounted;
a movement mechanism having an arm to which an attachment jig attached with the welding tool is fixed so as to be able to move the welding tool with respect to the processing target member by moving the arm;
a holding mechanism having a holding member movable with respect to the processing target member so as to hold the processing target member, in which the holding member and a portion of the mounting jig facing the holding member in the vertical direction define a pair of the holding member and the portion of the mounting jig,
the holding member pivotably supported at an end of the mounting member so as to define an upper position in which the processing target member is released from the holding member and a lower position in which the processing target member is pressed and held by the holding member with the pair of the holding member and the portion of the mounting jig being faced with each other, while turning between the upper position and the lower position;
respective coolant flow passages arranged in the pair of the holding member and the portion of the mounting jig profiles of which are to be overlapped intervening the processing target member in the vertical direction, with the holding member being positioned at the lower position;
a pipe having flexibility to connect the respective coolant flow passages, while allowing the holding member to turn between the upper position and the lower position; and
a coolant supply source configured to supply a coolant to the respective coolant flow passages, wherein the coolant supplied from the coolant supply source to one of the respective coolant flow passages is returned to the coolant supply source after flowing from the one of the respective coolant flow passages to the other of the respective coolant flow passages via the pipe.

2. The friction stir welding apparatus according to claim 1, wherein the mounting jig has a lower mounting portion and an upper mounting portion provided on the lower mounting portion and coming in contact with the processing target member, and a coefficient of thermal conductivity of the lower mounting portion is set larger than that of the upper mounting portion, and strength of the upper mounting portion is set higher than that of the lower mounting portion.

3. The friction stir welding apparatus according to claim 1, wherein the pair of holding member and the portion of the mounting jig form plural pairs according to a shape of the mounting jig as viewed from above, and the plural pairs respectively form a cooling system independent from each other that independently circulates the coolant.

4. The friction stir welding apparatus according to claim 2, wherein
- the pair of holding member and the portion of the mounting jig form plural pairs according to a shape of the mounting jig as viewed from above, and
- the plural pairs respectively form a cooling system independent from each other that independently circulates the coolant.

* * * * *